Figure 1:
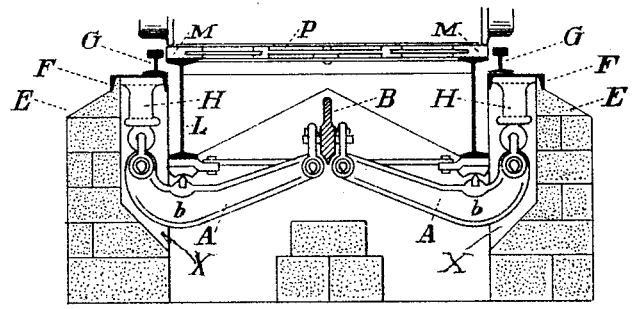

No. 777,012. PATENTED DEC. 6, 1904.
R. N. FAIRBANKS.
WEIGHING SCALE.
APPLICATION FILED APR. 18, 1903.
NO MODEL. 2 SHEETS—SHEET 1.

WITNESSES:
Albert Popkins
Laura V. Brereton

INVENTOR
Robert N. Fairbanks
BY
Sturtevant & Truley
ATTORNEYS.

No. 777,012.                                              Patented December 6, 1904.

UNITED STATES PATENT OFFICE.

ROBERT NOYES FAIRBANKS, OF LONDON, ENGLAND, ASSIGNOR TO THE E. & T. FAIRBANKS & COMPANY, OF ST. JOHNSBURY, VERMONT, A CORPORATION OF VERMONT.

WEIGHING-SCALE.

SPECIFICATION forming part of Letters Patent No. 777,012, dated December 6, 1904.

Application filed April 18, 1903. Serial No. 153,226. (No model.)

*To all whom it may concern:*

Be it known that I, ROBERT NOYES FAIRBANKS, a citizen of the United States, residing at London, England, have invented certain new and useful Improvements in Weighing-Scales, of which the following is a description, reference being had to the accompanying drawings and to the letters of reference marked thereon.

My invention relates to an improvement in weighing-scales, particularly to railroad-track scales; and the special object of the present invention is to provide a novel construction for supporting the main levers.

In the application filed by me on the 18th day of December, 1902, Serial No. 135,737, I have shown, described, and claimed a relieving-gear apparatus for railroad-track scales in which the scale is provided with only one set of rails, these rails resting upon the outer wall of the foundation, there being no rails whatever upon the scale-platform. There is, however, upon the scale-platform a horizontally-shiftable framework or support which when it is desired to use the platform for purposes of weighing can be brought into position so that the flanges of the car-wheels will ride upon and be supported by the framework, thus bringing the strain upon the platform to allow the weighing to be accomplished and taking the weight off the tracks. When, however, it is not desired to weigh, the cars will run over the track without being supported in any way upon the scale-platform. In said former application I have referred to the fact that the main levers shown therein instead of being suspended from stands on the bench-walls are suspended from yokes bolted or riveted to the channel-coping, and it is this feature shown in the drawings of the aforesaid application which forms the subject-matter of the present invention. In a scale of that character on account of the close relation which exists between the rail and the sliding horizontal plate which rests on the platform I-beams it is necessary that some provision be made to preserve this relation in case the lever of the scale is disturbed by frost or by settling. This, in brief, is accomplished by hanging the main levers to the same channel-irons which support the rails by means of the inverted arch. The platform I-beams are supported on the main levers by platform-bearings of the usual form. If frost heaves the coping out of level, all the parts will preserve the same relation as before, while if the main levers were supported on one foundation and the coping and rail on another a slight change of level might change the relation to such an extent as to make the relieving device inoperative.

The invention therefore consists, broadly, in a scale provided with a suitable coping and in devices supported by the coping from which the main levers are hung, with a platform supported on the main levers.

Further, the invention consists in the special construction of the parts and details, all as hereinafter described, and referred to in the appended claims.

The invention is illustrated in the accompanying drawings, in which—

Figure 2:
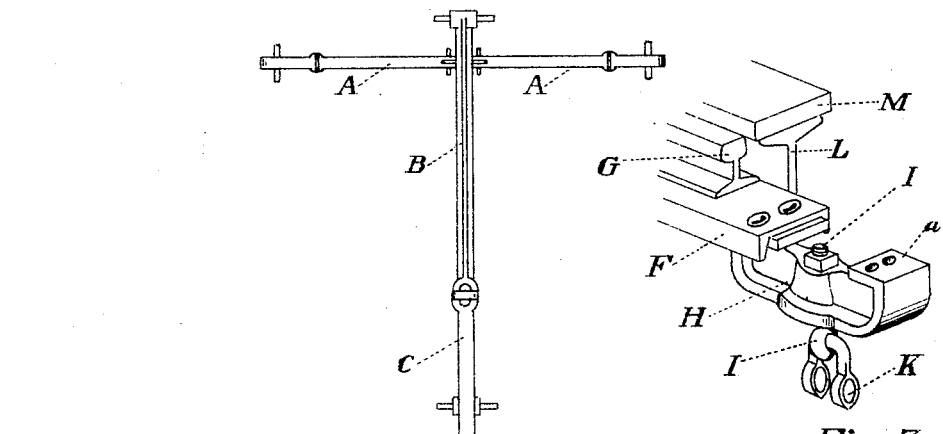
Figure 3:
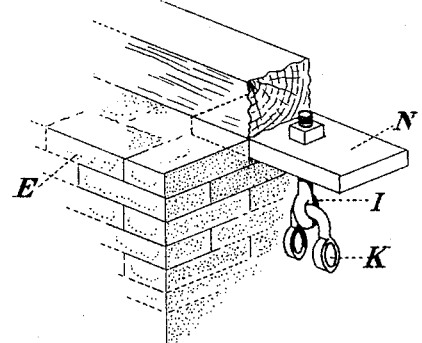
Figure 4:
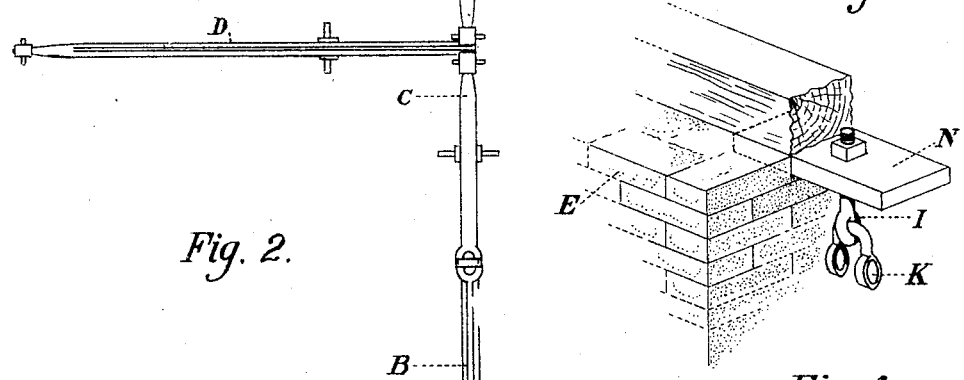
Figure 5:
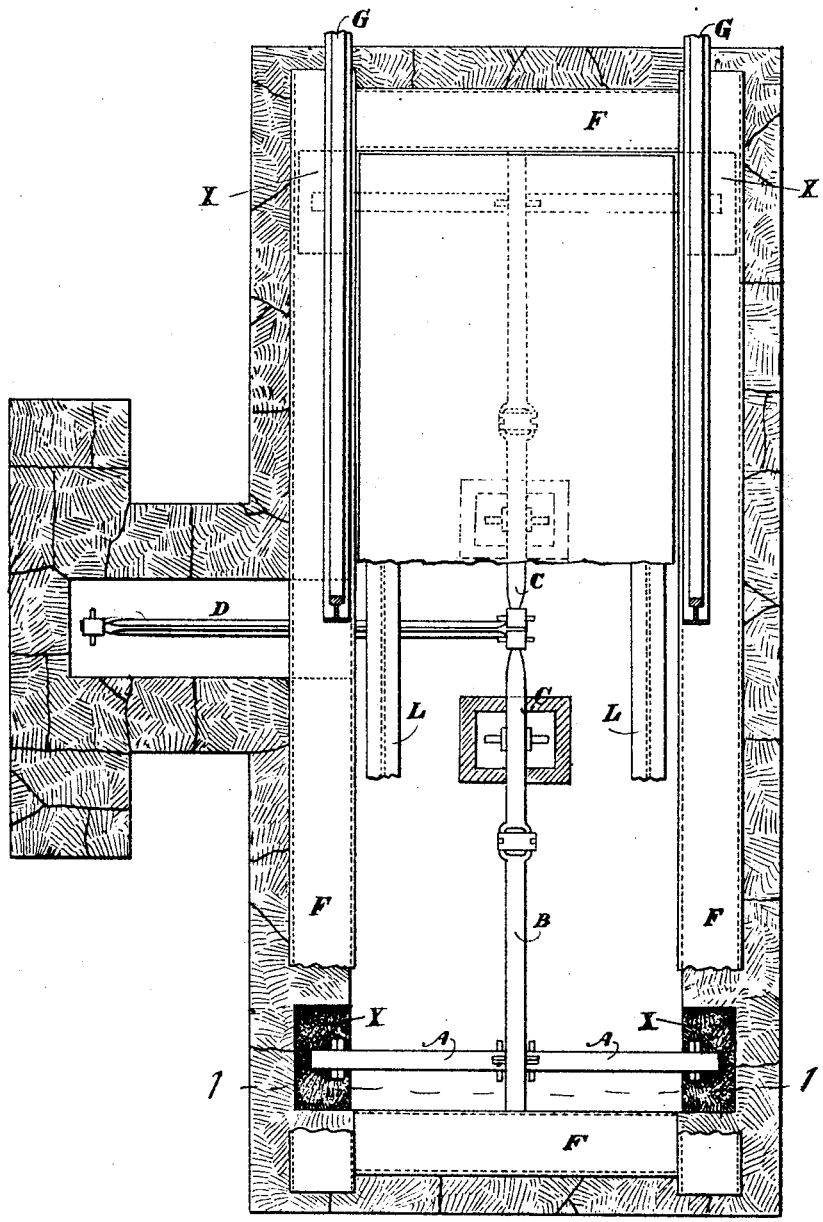

Figure 1 is a cross-sectional view on line 1 1 of Fig. 5 of a scale embodying my invention. Fig. 2 is a plan view showing the arrangement of levers detached. Fig. 3 is a detail view showing the manner of relieving the main levers. Fig. 4 is a view similar to Fig. 3 of a modification, and Fig. 5 is a plan view of my improved scale structure.

In the drawings, P represents the platform, A the main levers, B the extension-levers, C the even levers, and D the fifth lever, through which connection is made with the beam in the usual way. E represents the coping of the scale, and F represents channel-irons supported thereon, which channel-irons also carry the railroad-tracks G. As shown in Fig. 1 and also in Fig. 5, pocket portions or recesses are provided, and one side of the channel-irons on the longitudinal walls rests through their length upon the coping, which is formed to receive them, the ends being supported upon the coping, but the point of support of the main levers being within the recesses or pockets X. Bolted to the under side of these channel-irons are yokes or brackets H, constructed, preferably, as shown in Fig. 3, with inturned flange $a$, to be bolted or riveted to said channel-irons, and through the central part of said yoke, which is made very strong, is passed an eyebolt I, secured to said yoke. To the eye of this bolt is secured the loop K, from which is hung one end of the main levers A. In the usual manner the platform P is supported by I-beams L, which have V-bearings fitting the knife-edges $b$ on the main levers. The opposite ends of the main levers A are hung from the extension-levers B, connected to the even levers C in the usual way, and from these a fifth lever D leads to the beam through the usual connections. M represents the flat bars of iron sliding horizontally upon the top of the platform, which are manipulated out and in, as described in the aforesaid application, to receive the flanges of the wheels of the cars and transfer the weight thereof to the platform.

In Fig. 4 is shown a modification of the manner of hanging the main levers to the coping, in which a cast-steel bar N is secured between two layers of masonry of the coping, extending longitudinally beyond the adjacent vertical wall of the coping, and the eyebolt supporting the loop, which supports one end of the main levers, is secured to said flat bar.

It will be understood that so far as the construction of the supporting means is concerned, although it is of importance and is herein claimed specifically, it may be varied, the broad idea of the invention residing in the hanging of the main levers from the coping which supports the rails or from the channel-irons upon which the rails are placed, the platform being supported on the main levers, whereby no matter what reasonable displacement of the coping may take place the relative relation of the platform to the track and therefore the relieving mechanism on the platform will all remain the same.

I claim—

1. A weighing-scale having longitudinal walls, with recesses intermediate their ends, yokes or brackets supported by the walls and arranged within the recesses, transverse levers pivotally hung from said yokes or brackets, said pivotal connections being within the recesses of the walls, longitudinal levers connected with the transverse levers, a beam-lever connected with the longitudinal levers, and a platform mounted on the transverse levers; substantially as described.

2. A weighing-scale having longitudinal walls with recesses intermediate their ends, supports on said walls overhanging the recesses, transverse levers pivotally hung from said supports, the said pivotal connections being within the recesses of the walls, longitudinal levers connected with the transverse levers, a beam-lever connected with the longitudinal levers, and a platform mounted on the transverse levers; substantially as described.

3. A weighing-scale, having longitudinal walls with recesses intermediate their ends, supporting-beams on said walls overhanging the recesses, yokes or brackets secured to said supporting-beams within the recesses, main levers pivotally hung from said supports and a platform mounted on said main levers, means for supporting the opposite ends of said main levers; substantially as described.

4. A weighing-scale having longitudinal walls with recesses intermediate their ends, metallic supports secured to the walls, and overhanging the recesses, tracks on said supports, transverse levers pivotally hung from said metallic supports, the said pivotal connections being within the recesses of the walls, longitudinal levers connected with the transverse levers, a beam-lever connected with the longitudinal levers, and a platform mounted on the transverse levers; substantially as described.

5. In a weighing-scale having a longitudinal wall with reduced or cut-out portions forming pockets, supports resting on said wall, levers hung at one end from the supports within the pockets, means for supporting the opposite ends of said levers, and a platform supported on the levers; substantially as described.

6. In a weighing-scale having a suitable wall with reduced portions forming pockets, channel-irons having one edge supported on the wall, main levers hung at one end from the channel-irons within the pockets, means for supporting the opposite ends of said levers, and a platform supported on the main levers; substantially as described.

7. In a weighing-scale having a suitable wall with reduced portions forming pockets, suitable channel-irons secured to the wall and overhanging the same, yokes secured to the channel-irons and hanging directly beneath the same within the pockets, main levers suspended at one end from the yokes, means for supporting the opposite ends of said levers, and a platform supported on the main levers; substantially as described.

8. In a weighing-scale having a longitudinal wall with reduced or cut-out portions forming pockets, supports resting on the said wall, brackets hung from said supports within the pockets, levers hung at one end from said brackets, means for supporting the opposite ends of said levers, and a platform supported on the levers; substantially as described.

9. In a weighing-scale, having a suitable wall, channel-irons whose outer edges are secured thereto and overhang the same, yokes secured to said channel-irons, eyebolts secured to said yokes, main levers hung from said eyebolts, and a platform resting upon the main levers; substantially as described.

10. In a weighing-scale, the combination with longitudinal walls, having recessed or cut-out portions, forming part of the scale-pit, a metallic support at one edge attached to the longitudinal wall, and overhanging the recessed or cut-out portions, a track-rail secured to the upper part of said supports, transverse levers connected with the supports, said connections being within the recessed or cut-out portions, beams mounted on the transverse levers, and a platform resting on the beams, longitudinal levers connected to the transverse levers, and a beam-lever connected to the longitudinal levers; substantially as described.

11. In a weighing-scale, the combination with longitudinal walls, having recessed or cut-out portions, forming part of the scale-pit, a metallic support at one edge attached to the longitudinal wall, and overhanging the recessed or cut-out portions, a track-rail secured to the upper part of said supports, levers, loop-and-pivot connections between one end of the levers and the supports, said connections being within the recessed or cut-out portions, means for supporting the opposite ends of said levers, beams mounted on the levers, and a platform resting on the beams; substantially as described.

12. In a weighing-scale, the combination with longitudinal walls, having recessed or cut-out portions, forming part of the scale-pit, a metallic support at one edge attached to the longitudinal wall, and overhanging the recessed or cut-out portions, levers, loop-and-pivot connections between one end of the levers and the supports, said connections being within the recessed or cut-out portions, means for supporting the opposite ends of the levers, beams mounted on the levers, and a platform resting on the beams; substantially as described.

In testimony whereof I affix my signature in presence of two witnesses.

ROBERT NOYES FAIRBANKS.

Witnesses:
T. A. GEDDES,
ALFRED NUTTING.